United States Patent
Kulkarni et al.

(10) Patent No.: US 7,890,939 B2
(45) Date of Patent: Feb. 15, 2011

(54) PARTIAL METHODS

(75) Inventors: Dinesh C. Kulkarni, Sammamish, WA (US); Mads Torgersen, Issaquah, WA (US); Henricus Johannes Maria Meijer, Mercer Island, WA (US); Anders Hejlsberg, Seattle, WA (US); Matthew J. Warren, Redmond, WA (US); Peter A. Hallam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 11/674,333

(22) Filed: Feb. 13, 2007

(65) Prior Publication Data

US 2008/0196014 A1 Aug. 14, 2008

(51) Int. Cl.
*G06F 9/45* (2006.01)
(52) U.S. Cl. ...................... 717/143; 717/152
(58) Field of Classification Search ......... 717/136–137, 717/140–143, 146–148, 151–154, 159
See application file for complete search history.

(56) References Cited

U.S. PATENT DOCUMENTS

| 6,442,750 | B1 | 8/2002 | Lopes et al. | |
|---|---|---|---|---|
| 6,463,582 | B1 | 10/2002 | Lethin et al. | |
| 6,487,714 | B1 * | 11/2002 | Azagury et al. | 717/116 |
| 6,625,804 | B1 * | 9/2003 | Ringseth et al. | 717/114 |
| 6,631,517 | B1 | 10/2003 | Lamping et al. | |
| 6,817,014 | B2 | 11/2004 | Hundt et al. | |
| 6,865,730 | B1 * | 3/2005 | Burke et al. | 717/116 |
| 7,152,223 | B1 * | 12/2006 | Brumme et al. | 717/116 |
| 2002/0184615 | A1 | 12/2002 | Sumner et al. | |
| 2005/0091374 | A1 | 4/2005 | Ganesan et al. | |
| 2005/0138600 | A1 * | 6/2005 | Pavlovic et al. | 717/104 |
| 2005/0204344 | A1 | 9/2005 | Shinomi | |
| 2006/0015856 | A1 | 1/2006 | Lotter | |
| 2006/0026570 | A1 | 2/2006 | Chan et al. | |
| 2006/0130038 | A1 | 6/2006 | Claussen et al. | |
| 2006/0150150 | A1 | 7/2006 | Tiwari et al. | |
| 2006/0200806 | A1 | 9/2006 | Tasinga | |
| 2008/0147584 | A1 * | 6/2008 | Buss | 706/47 |

OTHER PUBLICATIONS

Arnold et al., "A Survey of Adaptive Optimization in Virtual Machines"; IEEE, 2005, 18pg.*
Bertot et al., "A Structured Approach to Proving Compiler Optimizations Based on Dataflow Analysis"; LNCS, 2006, 16pg.*
Whaley, John, "Partial Method Compilation using Dynamic Profile Information"; ACM, 2001, 14pg.*

(Continued)

*Primary Examiner*—Wei Y Zhen
*Assistant Examiner*—Ryan D Coyer
(74) *Attorney, Agent, or Firm*—Workman Nydegger

(57) ABSTRACT

Partial methods enable separation of method declaration and/or calls from method implementation. A partial method specifies a signature of a join or hook point in a class. Calls to a partial method specify a join or hook point in code that can optionally be linked with an actual method implementation of the same signature. Separate method implementations or other code related to a partial method are injected into a single program prior to execution. Unimplemented partial methods are treated as no operation instructions or otherwise ignored.

22 Claims, 11 Drawing Sheets

OTHER PUBLICATIONS

Karl Lieberherr, et al. Aspect-oriented programming with adaptive methods. Communications of the ACM, Oct. 2001, vol. 44, No. 10. http://portal.acm.org/citation.cfm?id=383845.383855. Last accessed Sep. 25, 2006.

Mitchell Wand, et al. A semantics for advice and dynamic join points in aspect-oriented programming. ACM Transcations on Programming Languages and Systems, vol. 26, No. 5, Sep. 2004, pp. 890-910. http://portal.acm.org/citation.cfm?1018203.1018208. Last accessed Sep. 25, 2006.

* cited by examiner

PARTIAL METHODS

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer using one or more programming languages creates the instructions comprising a computer program. Typically, source code is specified or edited by a programmer manually and/or with help of an integrated development environment. Subsequently, the source code can be compiled or otherwise transformed into computer instructions executable by a computer or like device.

By way of example, a programmer may choose to implemented code utilizing an object-oriented programming language (e.g., C#, Java . . . ). In accordance with such a paradigm, programmers will create a number of classes identifying properties and characteristics of an abstract thing as well as methods describing class behavior or abilities. Specific programmatic logic can then be specified as interactions between instances of classes or objects, among other things. Subsequently, executable code for a particular machine can be produced by an associated compiler. Alternatively, code can be transformed into intermediate code for a target virtual machine to facilitate execution on multiple computer platforms via further compilation or interpretation of the intermediate code.

In some situations, more than one party collaborates to produce final desired code. This occurs most commonly when a portion of code is generated by a program rather than written by a person. In rich frameworks and development environments large parts of a project's code are routinely generated automatically from visual form designers, database schemas, web-service descriptions and the like.

One issue with machine generated source code is that in many cases the resulting code needs to be tweaked and/or customized. For example, business logic may need to be added to boilerplate code to enable interaction with a given database. Accordingly, programmers can directly modify generated machine code to support any desired tweaks and/or customizations.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to method splitting via partial methods. In one embodiment, a method declaration and/or calls can be separated from implementation thereof. This enables code to be specified by different parties and subsequently combined into a single program. For example, method implementations can initially be specified in a separate file from other source code and later injected into the source code prior to execution. Among other things, this can be beneficial with respect to machine-generated code, large project work and generic program customization.

In accordance with one aspect of the disclosure, partial methods can provide strongly typed explicit hook points in code where additional functionality can be added by way of partial method implementation. As a result, a source program can be specified or generated by a first party including explicit partial method hooks, such that at least a second party can tweak or customize the code by implementing the hooks, or otherwise supplying code related to the hooks, in a separate file.

According to another aspect of the disclosure, partial methods without an associated implementation can be ignored or treated as a no operation instruction. In this manner, execution cost is borne only by those who desire to employ and provide such functionality. Stated differently, those that utilize code without implementing partial methods are not burdened with any overhead cost such as a call to an empty method.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are disclosed to support splitting of class members across more than one source. More particularly, source code can be designed with method signatures and hook points for potential method implementations. If desired, a programmer can provide an implementation for one or more of the methods in accordance with its signature in a separate file. The separate implementation can subsequently be combined with the source code and executed as if defined therein. Methods called that lack an implementation can be ignored or treated as no operation instructions. Split methods can also be utilized in more exotic ways including to replace and/or employ default implementations and to inject multiple method implementations and/or arbitrary methods, among others.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
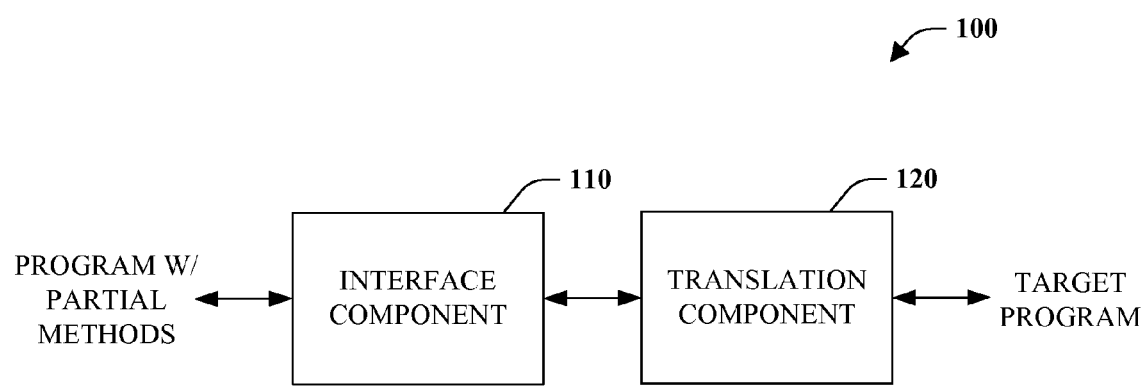
FIG. 1 is a block diagram of a program translation system.

Referring initially to FIG. 1, a program translation system 100 is illustrated in accordance with an aspect of the disclosure. The system 100 includes acquisition component 110 that receives, retrieves or otherwise acquires a source code program that supports and/or includes partial methods.

Partial methods are program methods whose code or behavior specified thereby can be split or defined across multiple sources. In accordance with one embodiment, a source code generator or developer can define strongly typed and explicit join or hook points in their code utilizing partial methods. Externally specified methods can then be injected into the source at or around the hook points. Among other things, this allows the generator and/or developer to maintain a degree of control regarding injected functionality thereby contributing to code safety.

The translation component 120 can receive or retrieve the source code program from the acquisition component 110. Subsequently, the translation component 120 can translate or transform the source code to target code. The target code can comprise executable code, object code, intermediate language code, among others. Accordingly, the translation component 120 can provide compilation functionality in accordance with an embodiment, wherein the results thereof can subsequently be executed by an execution engine or component (not shown).

Moreover, the translation component 120 can treat unimplemented or unspecified partial methods as no operation instructions or otherwise ignore them. Hence, calls to an unimplemented partial method can simply be removed during translation from the source to the target code, replaced with no-operation instructions, commented out, or the like. As a result, programmers can choose to provide an implementation or not and incur cost only when they desire to provide an implementation. Effectively, calls to an undesired partial method can be optimized out of the code so as not to incur a cost of calling an empty method.

By way of example, consider a method validate that validates a customers address to make sure it is free from errors. For instance, the method can check to make sure a zip code includes five digits. Source code can include a partial method call hook at appropriate portions in the code. Another programmer or user can then decide whether or not he/she would like to insert such logic. If a programmer desires to have such functionality, he/she can specify the code for checking the zip code in a separate location. Upon translation or compilation, the user method implementation can be added to the source program. Alternatively, a user may choose not to implement the zip code validation, for instance if a program does not require a zip code. In this instance, translation or compilation can treat source partial method calls as no-ops or otherwise ignore them such that the calls are cost free.

Figure 2:
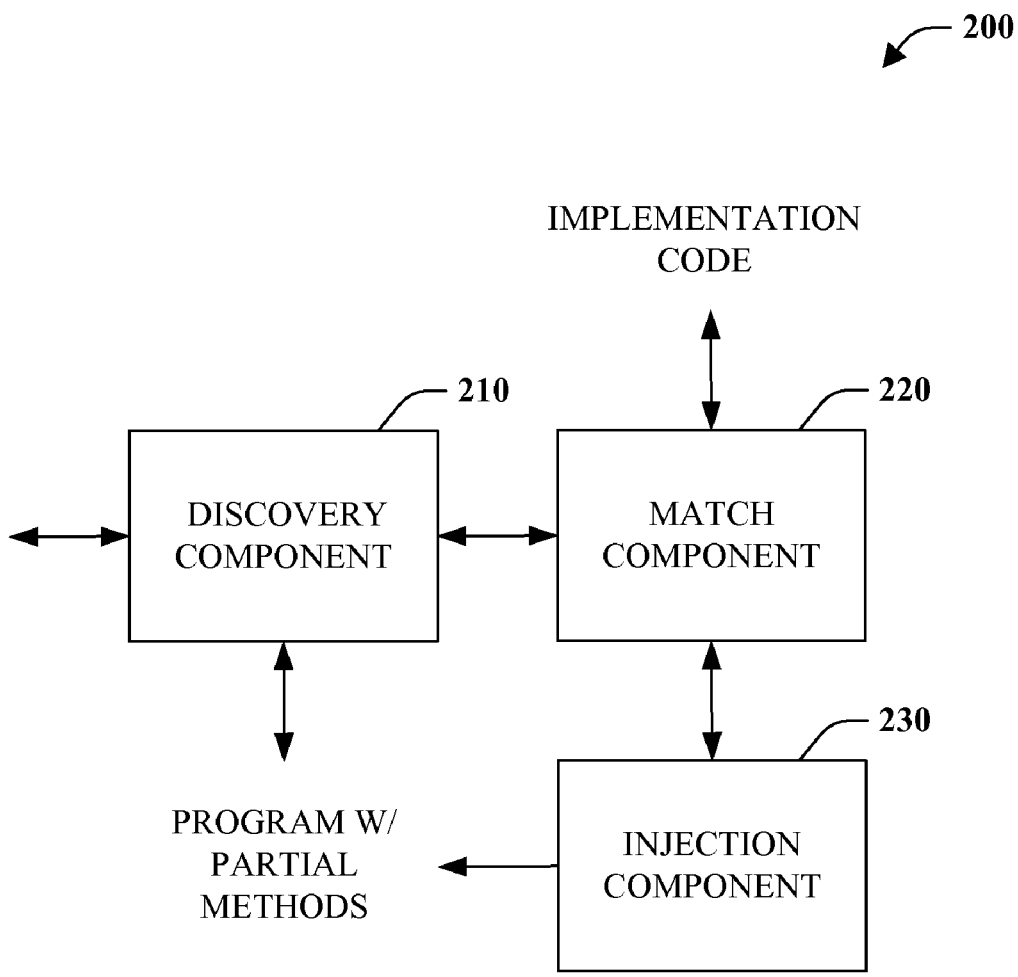
FIG. 2 is a block diagram of a representative code injection system.

Turning attention to FIG. 2, a code injection system 200 is illustrated that facilitates adding code to a source application in accordance with an aspect of the claimed subject matter. As mentioned supra, source code applications can include support for partial methods. In addition to partial method calls, a program can include a partial method signature that identifies a shape of code that can be applied at partial method calls or hook points in the code, including without limitation code parameters.

Discovery component 210 provides a mechanism for identifying partial methods in a source code program. More particularly, the discovery component 210 can search for and locate partial method signatures in a program, which may include designating syntax to aid location. Identified partial methods can be provided or otherwise made accessible to match component 220.

The match component 220 can identify partial method implementations that match a given method signature. Upon acquisition of a partial method signature from the discovery component 210, the match component 220 can search files including at least one partial method implementation. Implementation code is analyzed with respect to a partial method signature to determine or infer a match as a function of corresponding shape (e.g., name, parameters . . . ).

Injection component 230 can acquire identification of matching implementation code and/or the code itself from the match component 220 or an associated store. Subsequently or concurrently, the injection component 230 can inject the method code into each matching partial method call or another location in scope. In this manner, external implementations are weaved into a single program to enable execution thereof.

The claimed subject matter is not limited to the above functionality. It is also to be noted that the code injection system 200 can facilitate additional or alternative injection functions. For example, rather than injecting a single method implementation, multiple implementations can be injected for the same partial method that can be designated for execution in some order, for instance as a function of time or other contextual information.

Further yet, partial methods can exist and enable override of default code. By way of example, consider database interaction scenario. While default methods may be provided by framework libraries, a programmer may have a particular way he/she wants to update, add and delete data housed by a database. Initially generated code can include partial designations on such methods to enable overriding of default code. For instance, an update customer method can be designated as a partial method. Rather than using the default implementation, a programmer can put a separate method body in another file or location indicating that this is the implementation to be employed. The default method can provide a signature of shape to aid development of a replacement implementation. Subsequently, translation or compilation can replace the default method or otherwise specify use of the user implementation. It should also be appreciated that the overriding implementation can call the default implementation in particular cases.

Additionally, it is to be noted that arbitrary methods can be inserted into code relative to a hook or join point including those associated with partial methods and/or other methods. For instance, a method can be injected before, after or around a hook point. In one instance, a partial method implementation can identify a join point as well as its position relative thereto. In this case, partial methods can become defining points and actual the actual implementations can specify if they are executing before, after or around a partial method.

Figure 3:
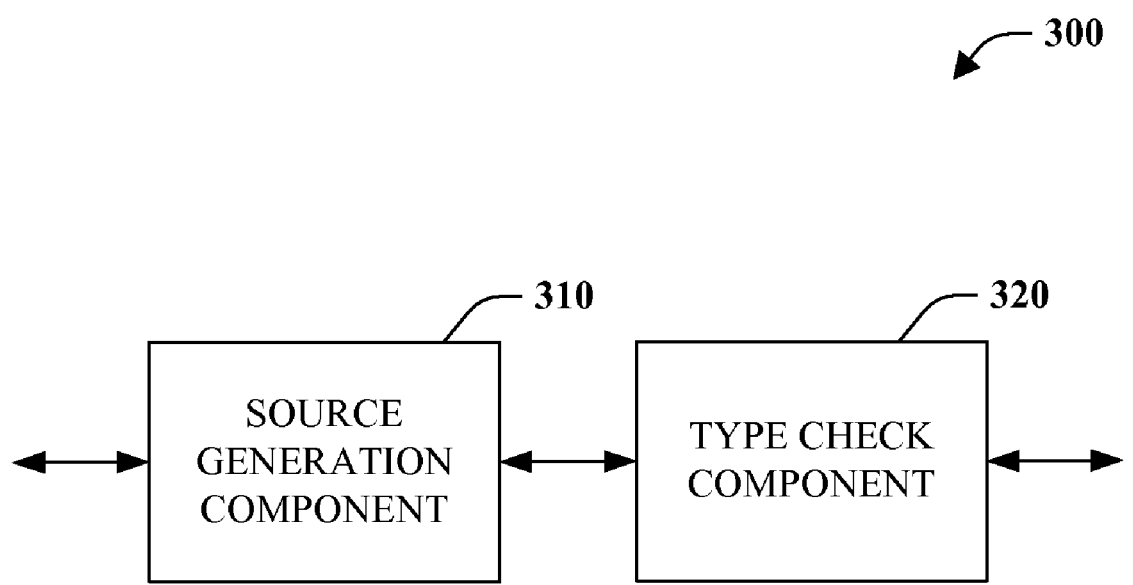
FIG. 3 is a block diagram of a code generation system that supports partial methods.

Referring to FIG. 3, a code generation system 300 is illustrated that supports partial methods. The source generation component 310 provides a mechanism for affording source code including one or more partial methods. In accordance with one embodiment, the generation component 310 can correspond to a machine or programmatic code generator, for example associated with automatic code generation. Additionally or alternatively, the source generation component 310 can provide a code editor and related tools to facilitate manual or semi-automatic specification by a human programmer.

The output of source generation component 310 is source code including at least one partial method. A partial method specifies a signature for a join point in a class. In accordance with one embodiment, a partial method can be specified within a partial class to take advantage of class split functionality associated with partial classes. Calls to the partial method specify a hole or hook point in code that can be plugged by an actual method implementation of the same signature. In one instance, such method implementation can be located in a separate file and weaved into a source file at an appropriate time.

In addition to being partial, such methods can be of various types and/or include different properties or attributes. For example, the partial methods can be static/class methods, instance/object methods, extension methods, public, private, abstract, virtual, etc. However, in certain implementations and/or circumstances there may be restrictions on method members. For example, since a partial method may or may not be implemented, an implementation may require it to be private to a class in which it is defined. For similar reasons, a partial method might be limited to returning void. Nevertheless, the scope of the claimed subject matter is not so limited, as these restrictions may not be a factor in particular program environments and/or can be overcome in other utilizing additional functionality to address such issues. For example, if a partial method is not implemented a default value can be assigned as its return value.

By way of example and not limitation, the following is exemplary code that can be produced by the source generation component 310:

```
//in generated code
partial class Customer {
    //join or hook points
    partial void OnNameChanging(string value);
    partial void OnNameChanged( );
    private string _name;
    public string name{
        set{
            OnNameChanging(value);
            _name = value;
            OnNameChanged( );
        }
    }
}
```

Here, the class defines two partial methods and invokes them before and after changing a value of the name property. This establishes a contract for other parts of the Customer class about (1) what the signature is at the join points, and (2) the join points where external code can be injected are explicitly specified by the receiving code portion.

Type check component 320 is a mechanism for type checking code generated by the source generation component 310, amongst others. Type parameters and type constraints are permitted on partial methods. In essence, both type parameter and type constraint are part of a method signature that should be repeated in the actual implementation. As a result, source code supporting partial methods can be type checked by type check component 320 to ensure proper operation. This can aid generation of correct code that includes partial methods. Furthermore, such type checking functionality can be employed on injected partial method implementations.

Figure 4:
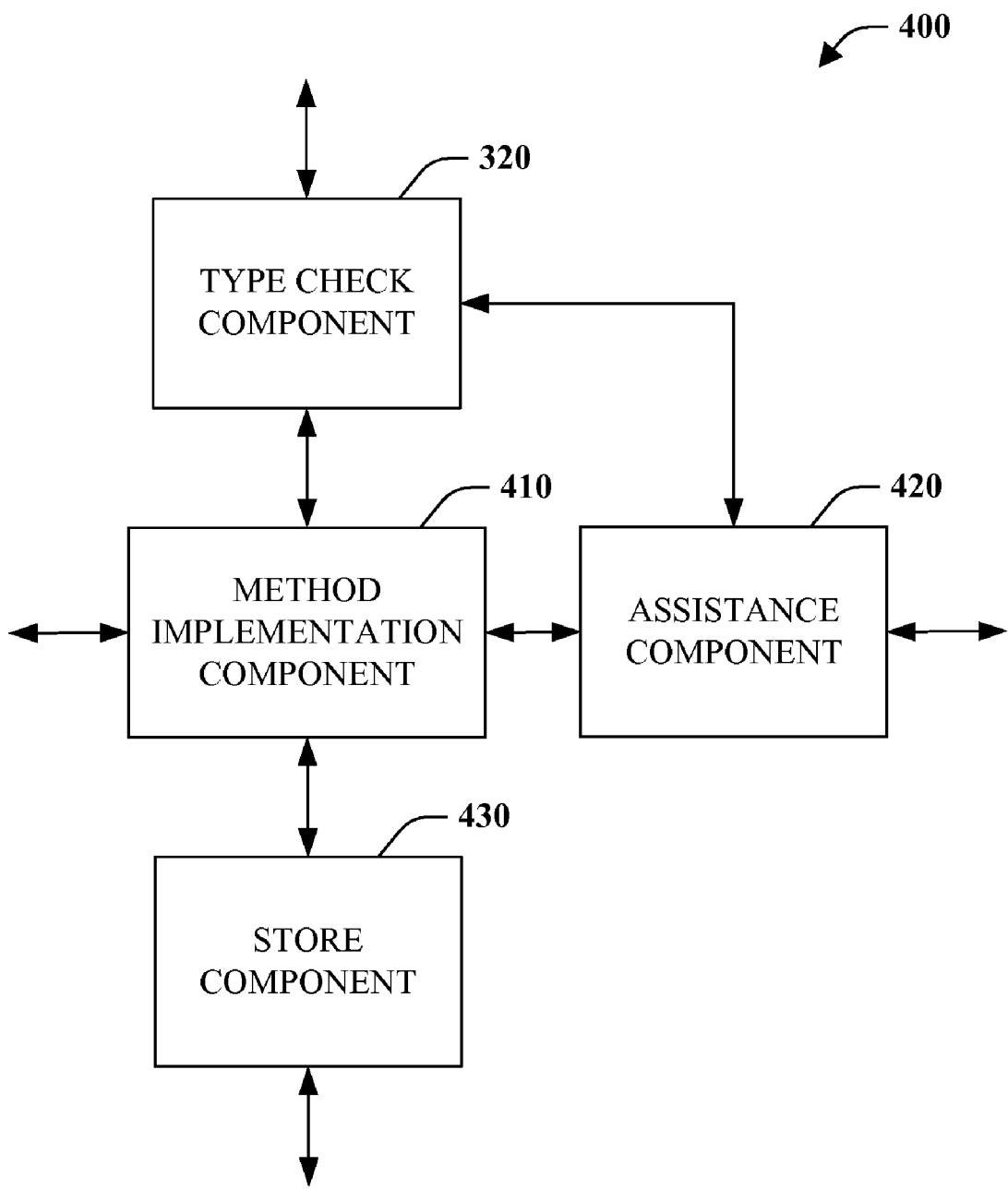
FIG. 4 is a block diagram of a partial method generation system.

FIG. 4 illustrates a partial method generation system 400 in accordance with an aspect of the disclosure. Method implementation component 410 provides a mechanism to facilitate specification of an actual partial method implementation. For instance, the component 410 can provide with a code editor to enable manual and/or semi-automatic code specification by a user.

Additionally, since a method implementation should correspond to a partial method signature or pattern, information can exist that can prove useful. More specifically, the implementation component 410 can be coupled to type check component 320 and assistance component 420. As previously described with respect to FIG. 3, the type check component 320 can be employed to verify types in view of a partial method signature, for instance. Similarly, the assistance component 420 can employ such type information, among other things, to assist specification of such code, for example, by providing intelligent auto-fill and/or suggestions inter alia. Furthermore, the system 400 includes a storage component 430 communicatively coupled to the implementation component 410 to enable generated method implementations to be saved to a particular store as a file or other object.

Further to the previous example with respect to the description of source code methods including partial methods, the following provides a code illustrating the shape of implementation code:

```
//in user-written file
partial class Customer{
    partial void OnNameChanging(string value){...}
    partial void OnNameChanged( ){...}
}
```

Modifiers on actual implementations can be the same or different from those on partial methods. Since partial methods are optional (e.g., if no method is specified they do no exist), partial member need not carry a modifier for visibility—that is, they can be designated as private. The actual method can specify a different modifier such as public, abstract, and virtual, among others, which can be the effective modifier for the method. Further, partial methods can be static or exclusive to a class. In such case, the corresponding method implementation should also be static. Still further, other attributes on a partial method can be added to the actual implementation.

There are a myriad of useful applications for the subject splitting technology including without limitation one in the code generation realm. In code generation, large portions of code can be generated automatically. One problem with such machine-generated code is that in many cases it needs to be tweaked or customized. However, when programmers directly modify the output of a code generator, their changes will be lost if the code generator needs to be run again. By placing these customized additions in a different source file, lost modifications can be greatly reduced or eliminated.

Partial type declarations allow greater flexibility in these situations by allowing definition of a class, struct or interface to be split into as many pieces as needed. While this is a great step forward, in many cases, it is necessary to inject user-defined code into machine-generated code at well-specified points. For example, in object-relational frameworks, users may want to inject constraint-checking code that is executed before an update is performed or change tracking code that needs to be executed before a change is made to an object graph.

Aspects of the claimed subject matter allow framework writers to define strongly typed and explicit join points in their code by means of partial methods. Partial members denote a signature of code or advice that can be applied at points in the code where partial members appear. Users can attach advice by among other thing providing an actual implementation of a partial method, which a compiler or like component can weave into the code. When there is no actual implementation defined for a partial method, if effectively behaves as a no-op resulting in no overhead cost for unused explicit join points.

Another exemplary use case can pertain to general or generic applications that need to be customized for a particular user or organization. For instances, some business programs are provided to enterprises that need to be customized in view of their resources and/or needs. More specifically, source code can be supplied to such customers and programmers made available to tailor application functionality to a particular organization. Conventionally, programmers needed to re-write or substantially modify default methods therein. Such a process can be simplified utilizing aspects of the claimed subject matter. For example, an application vendor can specify many of the methods that are most often rewritten as partial methods. Programmers can then specify their implementations of particular methods in a separate file. During translation, compilation of the like, default method implementations can be overwritten by the customized implementations. Additionally or alternatively, arbitrary methods can be inserted before, after or around such partial method calls as a further means of customization.

Still further yet, such functionality can be useful with respect to large projects. In such cases, it is desirable to enable multiple programmers to work in parallel on particular program pieces. By enabling methods to be implemented in separate files alone or in combination with partial classes, multiple programmers can work simultaneously on various aspects. Subsequently, the pieces can be merged together into a single program.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, code generators can utilizes such mechanism to generate code and identify or infer which methods to specify as partial. Additionally or alternatively, programmatic tools such as the assistant component 420 can employ such techniques to aid specification of method implementations.

In view of the exemplary systems described sura, methodologies that may be implemented in accordance with the disclosed subject matter will be better appreciated with reference to the flow charts of FIGS. 5-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 5:
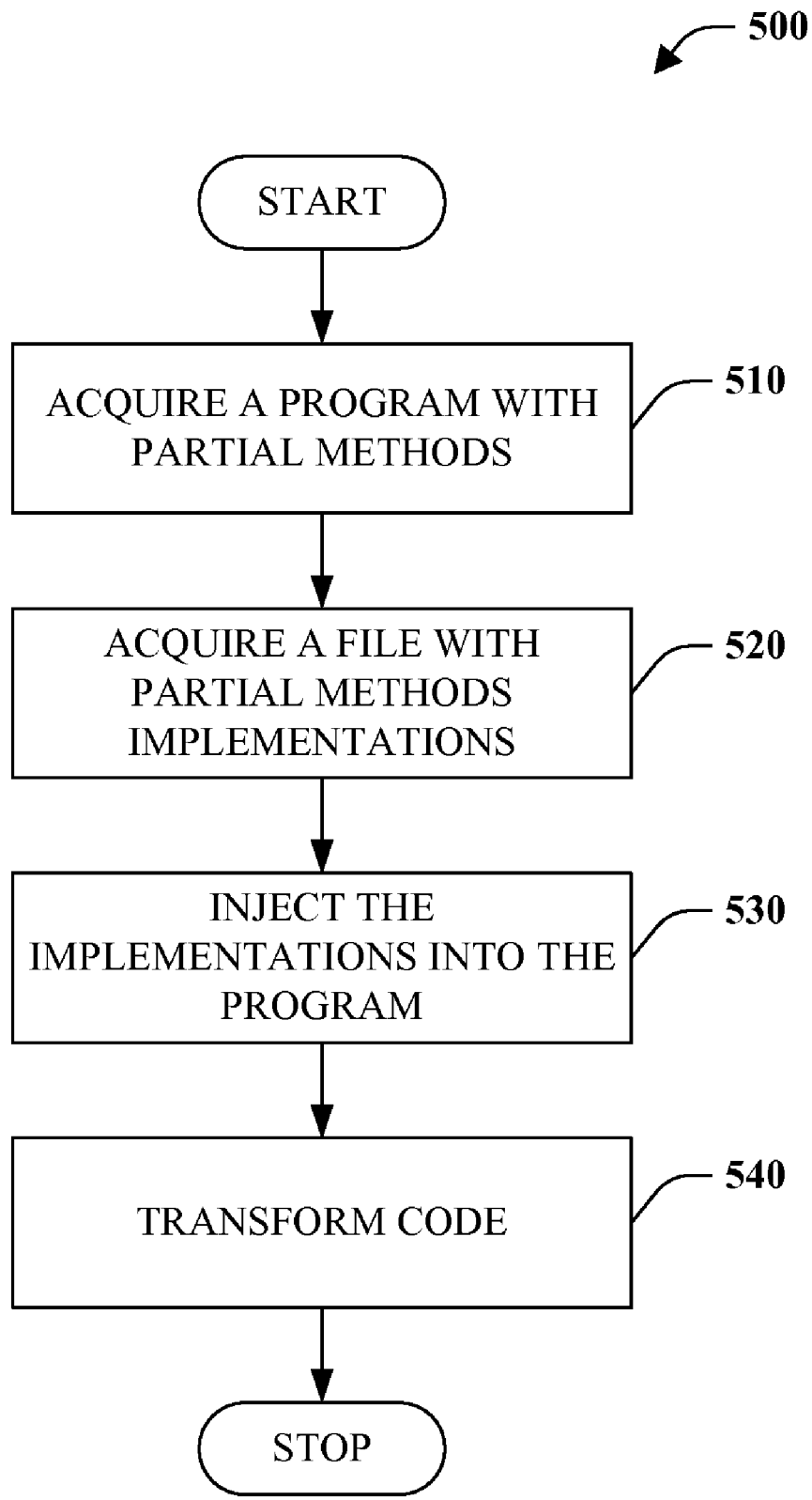
FIG. 5 is a flow chart diagram of a method of code translation or transformation.

Referring to FIG. 5, a method of code translation or transformation 500 is depicted. At reference numeral 510, a source code program or framework is acquired that includes one or more partial methods. Code implementations of or associated with the partial methods are acquired from one or more files separate from the source code program at numeral 520. At reference 530, the method implementations are injected into the source code program. For example, an unimplemented method can be injected with implementation code, a default method can be overwritten and/or arbitrary methods can be inserted before, after or around a partial method call. At reference numeral 540, the source code including partial method implementations can be translated or transformed into target code. Such translation can ensure any unspecified partial methods are not called, for example by not inserting them in the target code, commenting them out or inserting no operation instructions, among other things. In one embodiment, the code can be translated directly into executable code. Alternatively, the code can be translated into an intermediate language code that can subsequently be compiled or interpreted and executed.

Figure 6:
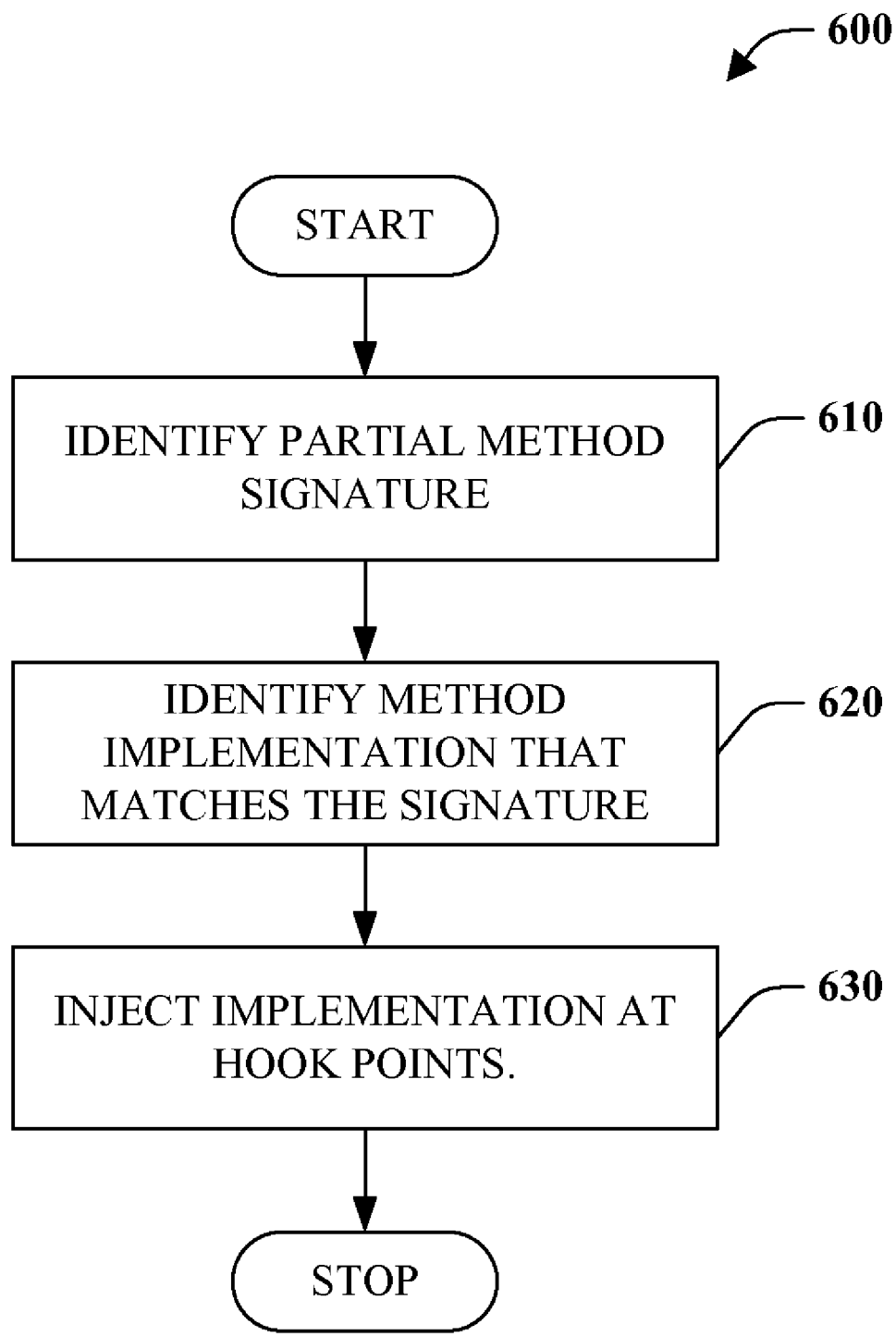
FIG. 6 is a flow chart diagram of a code injection method associated with partial methods.

FIG. 6 is a flow chart diagram of a code injection method 600 associated with partial methods. At reference numeral 610, a partial method signature is identified. The signature specifies the shape of advice or code (e.g., method type, properties, name, parameters, parameter types . . . ) that can be applied at or around points where partial methods appear in a program. For example, a signature may be a static method named "foo" that returns void and includes one input parameter named value of type string. At numeral 620, the identified signature is utilized to discover a matching implementation that has the same signature. This implementation can then be injected at or around associated partial method calls or hook points at reference 630.

Figure 7:
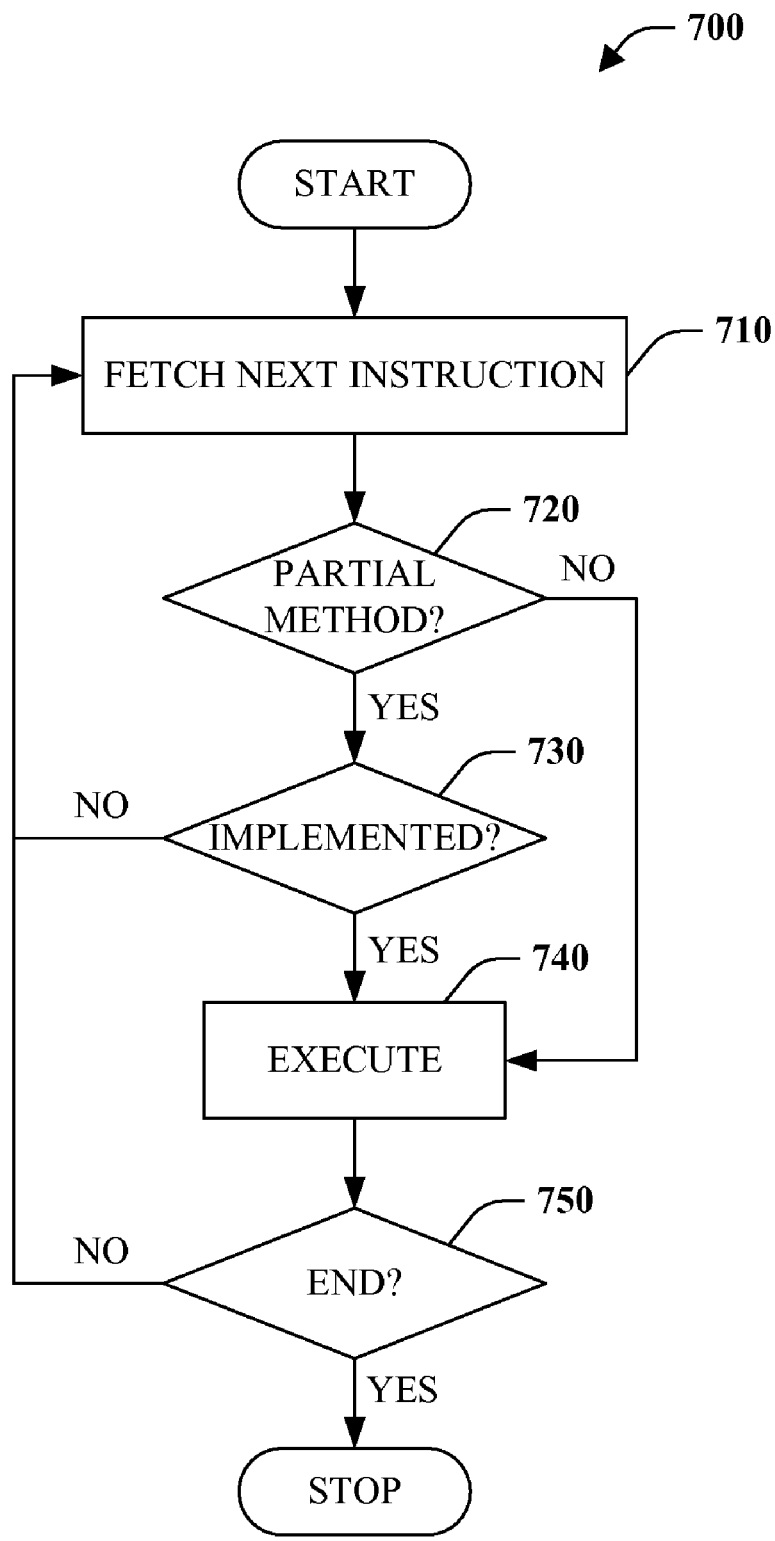
FIG. 7 is a flow chart diagram of an execution method for a program including partial methods.

FIG. 7 illustrates an execution methodology 700 for code including partial methods in accordance with an aspect of the claimed subject matter. At reference numeral 710, the next instruction is fetched from code. Initially, this will be the first instruction. A determination is made at numeral 720 as to whether the instruction is a partial method. If the instruction does not correspond to a partial method, then the instruction can be executed as normal at 740 and proceed to numeral 750 where it is determined whether there are more instructions to execute. However, if at 720, it is determined that the instruction corresponds to a partial method a second determination is made at 730 to determine whether the partial method has an associated implementation. If it does not have an implementation, the method 700 can continue or loop to numeral 710 where the next instruction is fetched. In other words, the empty instruction is not called but rather ignored or skipped. If a numeral 730, it is determined that the method is implemented then the instruction can associated therewith can be executed at numeral 740 and then proceed to 750. At reference numeral 750, a check is made to find out whether then end of the program has been reached. If the end has been reached, then the method 700 can simply terminate. However, if there are more instructions to be executed then the method 700 can loop back to numeral 710 where the next instruction is fetched and the method continues.

As shown by method 700, only methods with implementations are executed while those without are simply ignored or treated as no operation instructions in accordance with one embodiment. As a result initial source code programmers and/or code generators need not be concerned with the overhead associated with insertion of a number of partial methods. Consider for example the prevalence of a logging partial method that records actions or state upon occurrence of an event. Unlike other programmatic techniques such as event handlers, no cost is associated with an unimplemented partial method since it is not called. Accordingly, the method resembles a pay as you go approach, wherein only those who desire to implement partial methods will bear the execution cost.

Figure 8:
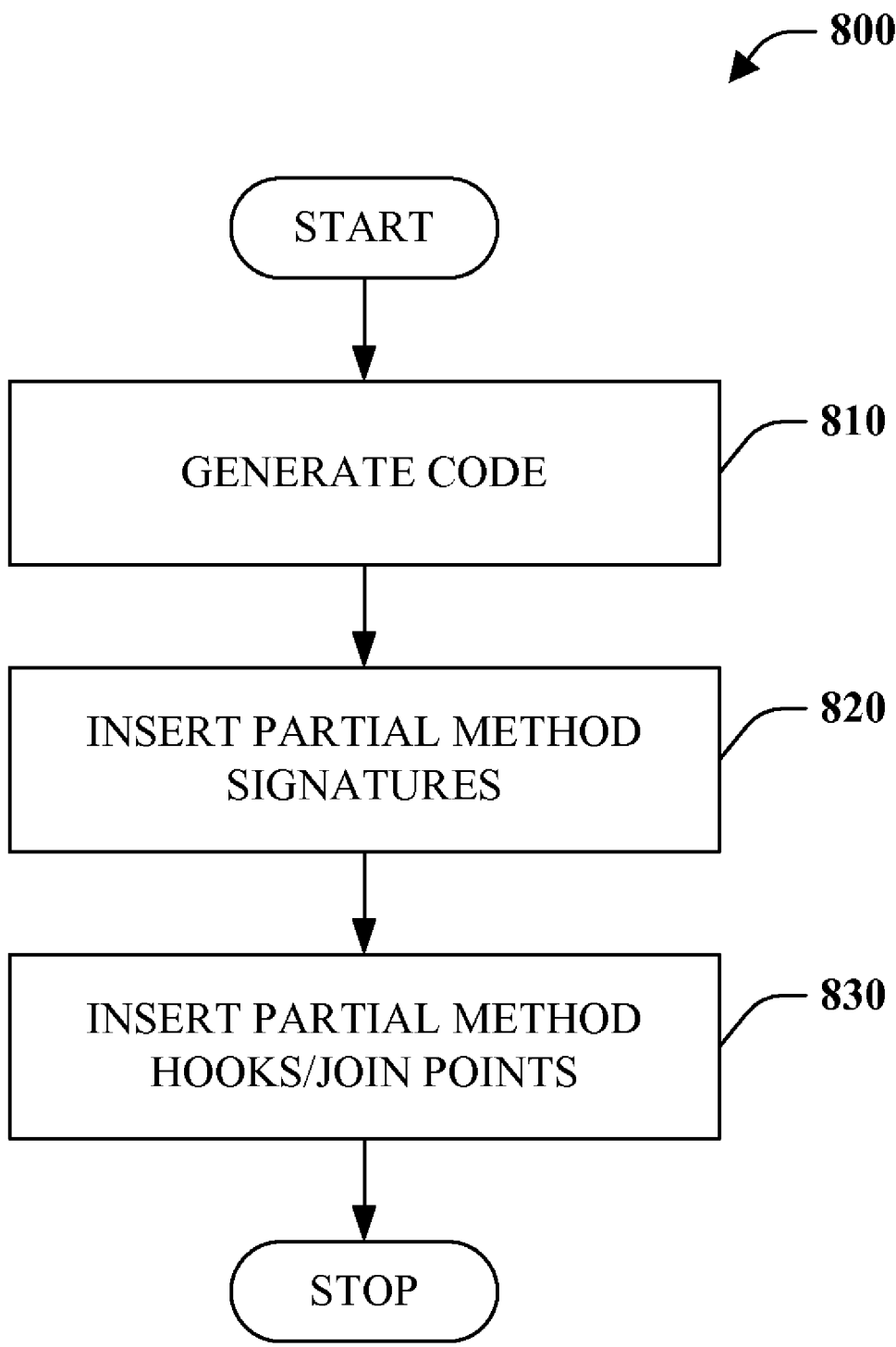
FIG. 8 is a flow chart diagram of a method of generating source code including partial methods.

FIG. 8 is a flow chart diagram depicting a method 800 of source code generation including partial methods. At reference numeral 810, code is generated to reflect desired programmatic logic, structure and the like. This can correspond to a conventional program development. At numeral 820, partial method signatures are inserted into the code identifying a shape of optionally inserted advice or implementation code such as the name of the partial method, parameters of the method and/or other properties or attributes associated with the method, among other things. Partial method hook or join points are inserted at reference numeral 830. These hook points can correspond to particular partial method calls in the code. These points explicitly identify points in the source code where other code can be inserted. In this manner, the code can be much safer than if code injection was allowed anywhere. Furthermore, it is to be noted in accordance with one embodiment that the partial method signatures and/or calls inserted into partial classes definition of which can similarly be split amongst files, for instance.

Figure 9:
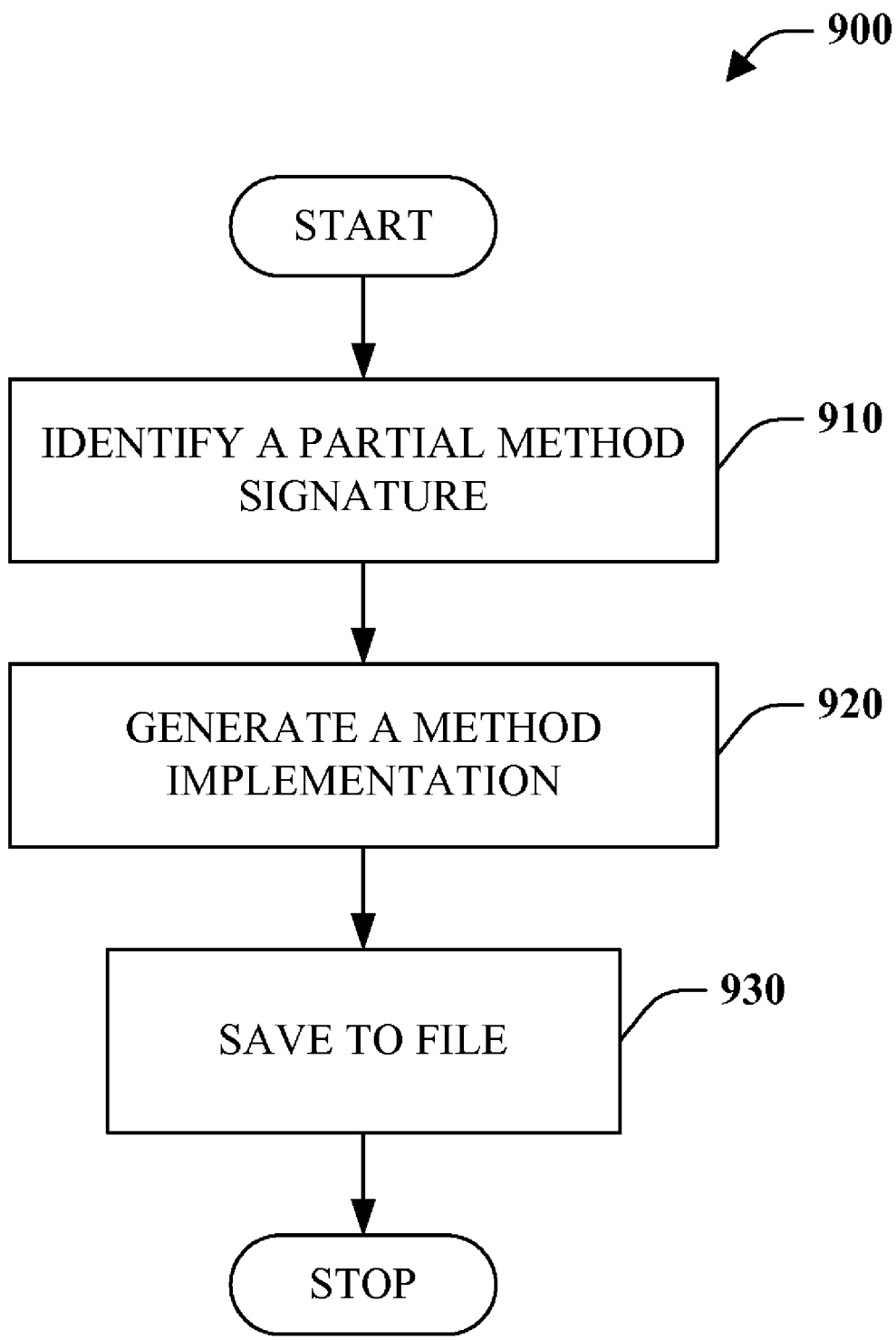
FIG. 9 is a flow chart diagram of a method of implementing partial methods.

FIG. 9 illustrates a method 900 of partial method implementation. At reference numeral 910, a partial method signature is acquired identifying the shape or requirements associated with the method implementation. At reference, numeral 920 a method implementation is specified or generated in accordance with the signature. For example, if the signature identifies a static method then the actual implementation will correspond to a static method. Furthermore, such implementations can be the sole code associated with a partial method, code intended to override a default implementation or arbitrary code injected before, after or around a partial method hook point, among other things. In the case of arbitrary code injection, the code can define whether it is to be inserted before, after or around a partial method call. At numeral 930, the generated code can be saved to a file or other construct that can later be employed to weave the code into an associated source code program.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
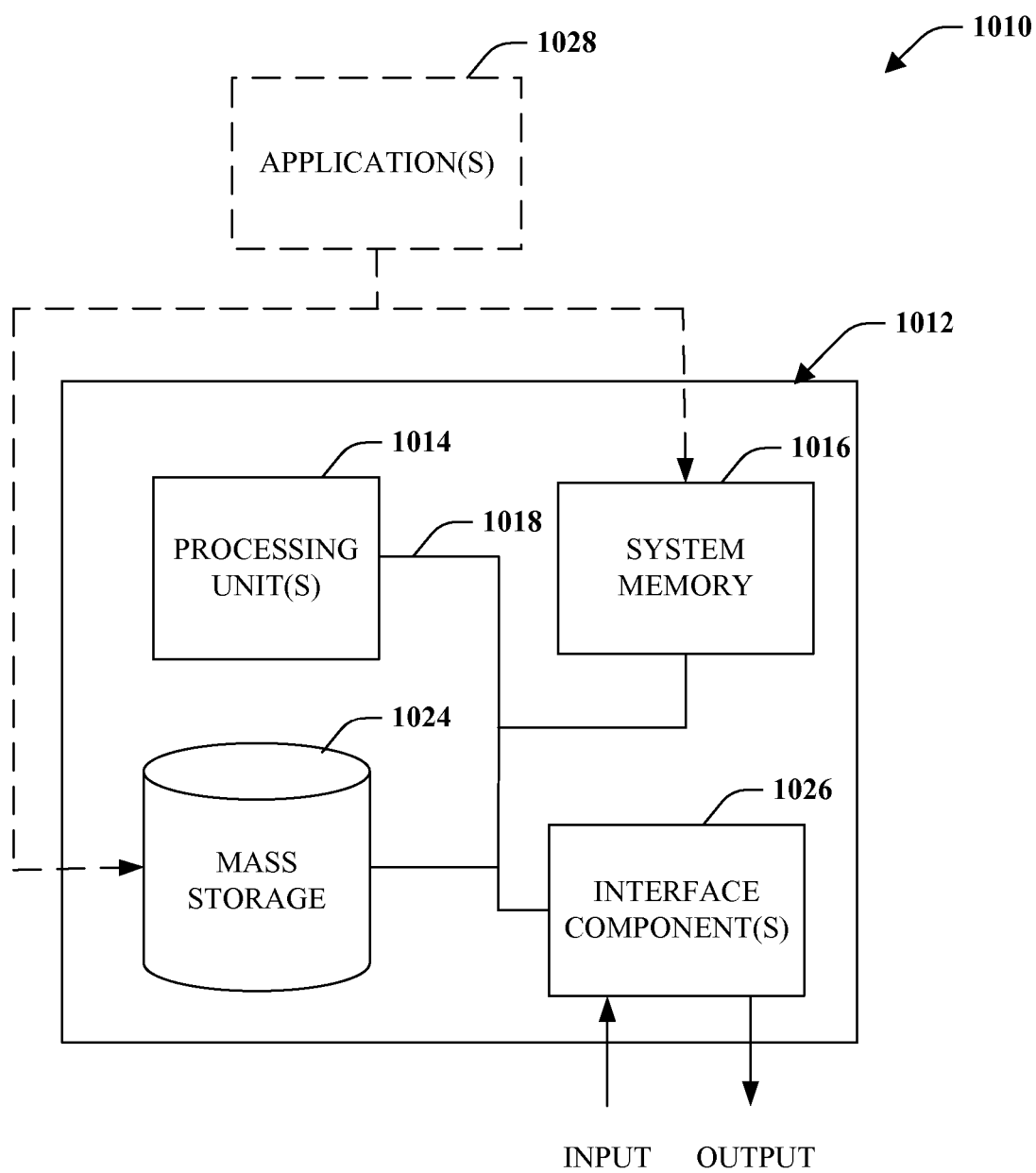
FIG. 10 is a schematic block diagram illustrating a suitable operating environment for aspects of the subject disclosure.
Figure 11:
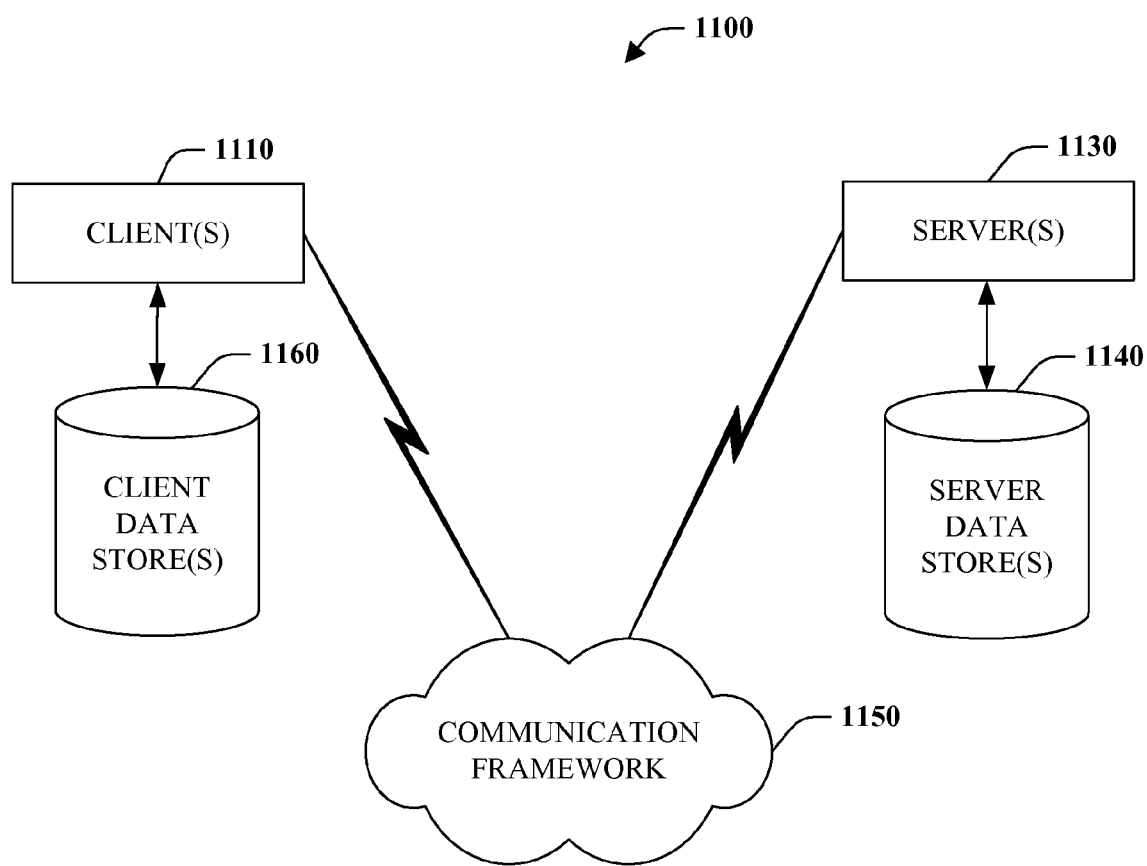
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016 and a system bus 1018. The system bus 1018 couples system components including, but not limited to, the system memory 1016 to the processing unit 1014. The processing unit 1014 can be any of various available microprocessors. It is to be appreciated that dual microprocessors, multi-core and other multiprocessor architectures can be employed as the processing unit 1014.

The system memory 1016 includes volatile and nonvolatile memory. The basic input/output system (BIOS), containing the basic routines to transfer information between elements within the computer 1012, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1012 also includes removable/non-removable, volatile/non-volatile computer storage media. FIG. 10 illustrates, for example, mass storage 1024. Mass storage 1024 includes, but is not limited to, devices like a magnetic or optical disk drive, floppy disk drive, flash memory or memory stick. In addition, mass storage 1024 can include storage media separately or in combination with other storage media.

FIG. 10 provides software application(s) 1028 that act as an intermediary between users and/or other computers and the basic computer resources described in suitable operating environment 1010. Such software application(s) 1028 include one or both of system and application software. System software can include an operating system, which can be stored on mass storage 1024, that acts to control and allocate resources of the computer system 1012. Application software takes advantage of the management of resources by system software through program modules and data stored on either or both of system memory 1016 and mass storage 1024.

The computer 1012 also includes one or more interface components 1026 that are communicatively coupled to the bus 1018 and facilitate interaction with the computer 1012. By way of example, the interface component 1026 can be a port (e.g., serial, parallel, PCMCIA, USB, FireWire . . . ) or an interface card (e.g., sound, video, network . . . ) or the like. The interface component 1026 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1012 to output device(s) via interface component 1026. Output devices can include displays (e.g., CRT, LCD, plasma . . . ), speakers, printers and other computers, among other things.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the aspects of the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

By way of example, programs employing partial methods can be implemented on either a client 1120 or server 1130. Alternatively, processing can be distributed across a client 1120 and server 1130. Still further yet, partial method implementations can be housed in either or both of data stores 1160 and 1140 and be transmitted across the communication framework 1150 where needed to facilitate incorporation into a source code program or framework.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer system, the computer system comprising a processor operatively coupled to a memory and one or more storage media having computer-executable instructions that, when executed by the processor, implement a method for integrating partial method implementations into a source code program that includes partial method calls, the method comprising:

a processor acquiring a source code program that includes one or more partial method calls, wherein at least one of the partial method calls is associated with a partial method hook signature that is used to identify one or more partial method implementations outside of the at least one partial method call and that can be applied at the at least one partial method call to implement the at least one partial method call;

the processor acquiring a particular partial method implementation that implements code for the least one partial method call and which is acquired upon identifying that the particular partial method implementation has a particular partial method hook signature matching the partial method hook signature of the least one partial method call;

the processor injecting the particular partial method implementation into the source code by injecting implementation code from the particular partial method implementation directly into the source code; and the processor transforming the source code into target code by at least compiling the source code with the injected implementation code, while treating any unimplemented partial method calls as no operation instructions.

2. The computer system of claim 1, wherein the implementation code from the particular partial method implementation overrides a default method implementation of the at least one partial method call.

3. The computer system of claim 2, wherein the implementation code calls the default method implementation.

4. The computer system of claim 1, further comprising injecting at least one other particular partial method implementation that also implements the at least one partial method call into the source code by injecting other implementation code from the at least one other particular partial method implementation directly into the source code, wherein the implementation code from the particular partial method and the other implementation code from the other particular partial method implementation are configured to be executed in an identified order.

5. The computer system of claim 1, further comprising:
discovering partial method hook signatures specified in the source code; and
matching at least one of the hook signatures to a partial method implementation.

6. The computer system of claim 1, wherein injecting the particular partial method implementation directly into the source code comprises injecting the implementation code from the particular partial method before, after or around a hook point in the source code as specified by the implementation.

7. The computer system of claim 1, wherein the source code, including the partial method calls, is machine generated.

8. The computer system of claim 7, wherein the particular partial method implementation is user specified.

9. A method implemented within a computer system that includes a processor and memory storing instructions which, when executed by the processor, implement the method for integrating partial method implementations into a source code program that includes partial method calls, the method comprising:

acquiring a source code program that includes one or more partial method calls, wherein at least one of the partial method calls is associated with a partial method hook signature that is used to identify one or more partial method implementations outside of the at least one partial method call and that can be applied at the at least one partial method call to implement the at least one partial method call;

acquiring a particular partial method implementation that implements code for the least one partial method call and which is acquired upon identifying that the particular partial method implementation has a particular partial method hook signature matching the partial method hook signature of the least one partial method call;

injecting the particular partial method implementation into the source code by injecting implementation code from the particular partial method implementation directly into the source code; and transforming the source code into target code by at least compiling the source code with the injected implementation code, while treating any unimplemented partial method calls as no operation instructions.

10. The method of claim 9, further comprising retrieving a user defined file that defines the particular partial method implementation.

11. The method of claim 10, further comprising acquiring the source code from a code generation program.

12. The method of claim 9, further comprising;
acquiring another particular partial method implementation that also implements code for the at least one partial method call and which is acquired upon identifying the that another particular partial method implementation also has the particular partial method hook signature matching the partial method hook signature of the at least one partial method call; and injecting the another particular partial method implementation into the source code by injecting other implementation code from the another particular partial method directly into the source code, wherein the implementation code from the particular partial method and the other implementation code from the another particular partial method are configured to be executed in a designated order.

13. The method of claim 9, wherein injecting the particular partial method implementation into the source code comprises overriding a default implementation of the at least one partial method call with the implementation code from the particular partial method.

14. The method of claim 9, wherein injecting the particular partial method implementation into the source code comprises injecting the implementation code from the particular partial method before, after or around the at least one partial method call.

15. The method of claim 9, wherein treating any unimplemented partial method calls as no operation instructions comprises removing any unimplemented partial method calls from the target code.

16. One or more storage media having stored thereon computer-executable instructions that, when executed by one or more processors of a computer system, implement a method for integrating partial method implementations into a source code program that includes partial method calls, the method comprising:

a computing system, having one or more processors, acquiring a source code program that includes one or more partial method calls, wherein at least one of the partial method calls is associated with a partial method hook signature that is used to identify one or more partial method implementations outside of the at least one partial method call and that can be applied at the at least one partial method call to implement the at least one partial method call;

the computing system acquiring a particular partial method implementation that implements code for the least one partial method call and which is acquired upon identifying that the particular partial method implementation has a particular partial method hook signature matching the partial method hook signature of the least one partial method call;

the computing system injecting the particular partial method implementation into the source code by injecting implementation code from the particular partial method implementation directly into the source code; and the computing system transforming the source code into target code by at least compiling the source code with the injected implementation code, while treating any unimplemented partial method calls as no operation instructions.

17. The method of claim 9, wherein injecting the particular partial method implementation directly into the source code comprises injecting the implementation code from the particular partial method into an unimplemented method associated with the at least one partial method call.

18. The method of claim 9, wherein the partial method hook signature comprises a method name and a property associated with the partial method call.

19. The method of claim 18, wherein the property is a return type of the partial method call.

20. The method of claim 18, wherein the partial method hook signature is identified by a number and type of parameters to the partial method call.

21. The method of claim 9, wherein injecting the particular partial method implementation directly into the source code occurs prior to any compiling of the source code.

22. The method of claim 10, wherein the user defined file is a file that is independently separated from the source code program.

* * * * *